US008205189B2

(12) United States Patent
Grossman et al.

(10) Patent No.: US 8,205,189 B2
(45) Date of Patent: Jun. 19, 2012

(54) METHOD AND SYSTEM FOR DEFINITION CONTROL IN A DATA REPOSITORY APPLICATION

(75) Inventors: Michael Grossman, Marlborough, MA (US); John Rees, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1375 days.

(21) Appl. No.: 11/777,568

(22) Filed: Jul. 13, 2007

(65) Prior Publication Data

US 2008/0016110 A1     Jan. 17, 2008

Related U.S. Application Data

(60) Provisional application No. 60/807,246, filed on Jul. 13, 2006, provisional application No. 60/807,252, filed on Jul. 13, 2006.

(51) Int. Cl.
*G06F 9/44* (2006.01)
*G06F 7/00* (2006.01)

(52) U.S. Cl. ................. 717/120; 717/100; 707/600

(58) Field of Classification Search ............ 717/100, 717/120–123; 707/600–606
See application file for complete search history.

(56) References Cited

U.S. PATENT DOCUMENTS

| | | | | |
|---|---|---|---|---|
| 5,649,200 A | * | 7/1997 | Leblang et al. | 717/122 |
| 5,675,802 A | * | 10/1997 | Allen et al. | 717/103 |
| 6,002,867 A | * | 12/1999 | Jazdzewski | 717/105 |
| 6,449,624 B1 | * | 9/2002 | Hammack et al. | 1/1 |
| 6,968,536 B2 | * | 11/2005 | Jazdzewski | 717/106 |
| 7,266,805 B2 | * | 9/2007 | Weidman et al. | 717/101 |
| 7,353,494 B2 | * | 4/2008 | Nielsen et al. | 717/116 |
| 7,434,203 B2 | * | 10/2008 | Stienhans et al. | 717/120 |
| 7,676,793 B2 | * | 3/2010 | Himmer et al. | 717/122 |
| 7,735,063 B2 | * | 6/2010 | Herzog et al. | 717/121 |
| 7,774,369 B2 | * | 8/2010 | Herzog et al. | 707/793 |
| 2002/0080200 A1 | * | 6/2002 | Wong et al. | 345/969 |
| 2002/0083415 A1 | * | 6/2002 | Jazdzewski | 717/111 |
| 2004/0093581 A1 | * | 5/2004 | Nielsen et al. | 717/101 |
| 2004/0133444 A1 | * | 7/2004 | Defaix et al. | 705/1 |
| 2005/0108684 A1 | * | 5/2005 | Sohn et al. | 717/120 |
| 2005/0125800 A1 | * | 6/2005 | Himmer et al. | 718/106 |
| 2005/0246687 A1 | * | 11/2005 | Scott | 717/122 |
| 2005/0268232 A1 | * | 12/2005 | Stienhans et al. | 715/700 |
| 2006/0010163 A1 | * | 1/2006 | Herzog et al. | 707/104.1 |
| 2006/0010434 A1 | * | 1/2006 | Herzog et al. | 717/168 |
| 2006/0136904 A1 | * | 6/2006 | Weidman et al. | 717/172 |

* cited by examiner

*Primary Examiner* — Wei Zhen
*Assistant Examiner* — Qing Chen
(74) *Attorney, Agent, or Firm* — Kraguljac Law Group, LLC

(57) ABSTRACT

A method and system for definition control in a data repository application. Each structure for the repository application is defined. Each structure and a corresponding definition for the structure are stored in a library. An object is created for each structure stored in the library that points to the definition. The structures are interconnected as the application is built. The repository application is built for a specific use includes each of the interconnected structures and provides automatic tracking of each use of each definition and automatic cascading of definition changes to each use.

7 Claims, 9 Drawing Sheets

METHOD AND SYSTEM FOR DEFINITION CONTROL IN A DATA REPOSITORY APPLICATION

CROSS-REFERENCE TO RELATED APPLICATIONS

This application claims the benefit of, and priority to, U.S. Provisional Application Nos. 60/807,246 and 60/807,252, both filed on Jul. 13, 2006, the disclosures of which are incorporated herein by reference in their entirety.

BACKGROUND

1. Field

The disclosed embodiments generally relate to data collection and data warehousing, and in particular to developing and creating data repositories, including data warehouse design and maintenance applications.

2. Brief Description of Related Developments

When a user builds a data repository of information and reports, typically they make copy of an already existing set of programs, reports, table structures, etc. and then modify the definitions for the specific purpose. Usually there is a combination of standard and non-standard definitions used. The standard structures may or may not come from a library of standards.

Once these copies have been created and modified, they need to be fully retested in each specific application. As problems are found in the original definitions that were the source of the copy, these changes cannot be automatically cascaded to the places that have used various versions of the original source definition.

Currently companies deal with this problem with a set of complex and expensive manual processes. This process usually requires trained specialists and the cost of rolling out and maintaining many large-scale custom repositories across the entire enterprise is prohibitive. It would be advantageous, therefore, to be able to develop or build an application based upon interconnected instances of library definitions.

SUMMARY

In one aspect, the disclosed embodiments are directed to a method of definition control in a data repository application. In one embodiment, the method includes defining each structure for the repository application. Each structure and a corresponding definition for the structure is stored in a library. An object is created for each structure stored in the library that points to the definition. The structures for which the object is created are interconnected as the application is built. The repository application built for a specific use includes each of the interconnected structures. Source definitions are updated in response to a change in an instance of the source definition and the changed source definition is available to all instances of the source definition.

In another aspect the disclosed embodiments are directed to a system. In one embodiment the system includes at least one repository application area; a library area related to an underlying application, the library area configured to include all definitions and structure related to the underlying application; a work area between the at least one repository application and the library area, the work area configured to provide a link from each definition stored in the library area and an object related to a use of a definition coupled to the at least one repository application and interconnect each definition and structure within the work area; a definition tracking system configured to monitor all relationships between the library area and track each use of each definition; a definition update system configured to receive definition changes from the work area, update a source definition in the library area, and cascade the updated source definition to each use of the definition by a repository application.

In a further aspect the disclosed embodiments are direct to a computer program product. In one embodiment, the computer program product includes a computer useable medium having computer readable code means embodied therein for causing a computer to provide definition control in a data repository application. The computer readable code means in the computer program product also includes computer readable program code means for causing a computer to define each structure for the repository application; computer readable program code means for causing a computer to store each structure and a corresponding definition in a library; computer readable program code means for causing a computer to create an object that points to the definition as the definition for each structure stored in the library is used; computer readable program code means for causing a computer to build the repository application for a specific use that includes each of the interconnected structures; and computer readable program code means for causing a computer to update a source definition in response to a change in an instance of the source definition, and make the changed source definition being available to all instances of the source definition.

BRIEF DESCRIPTION OF THE DRAWINGS

The foregoing aspects and other features of the present invention are explained in the following description, taken in connection with the accompanying drawings, wherein.

DETAILED DESCRIPTION OF THE EMBODIMENT(S)

Figure 1A:
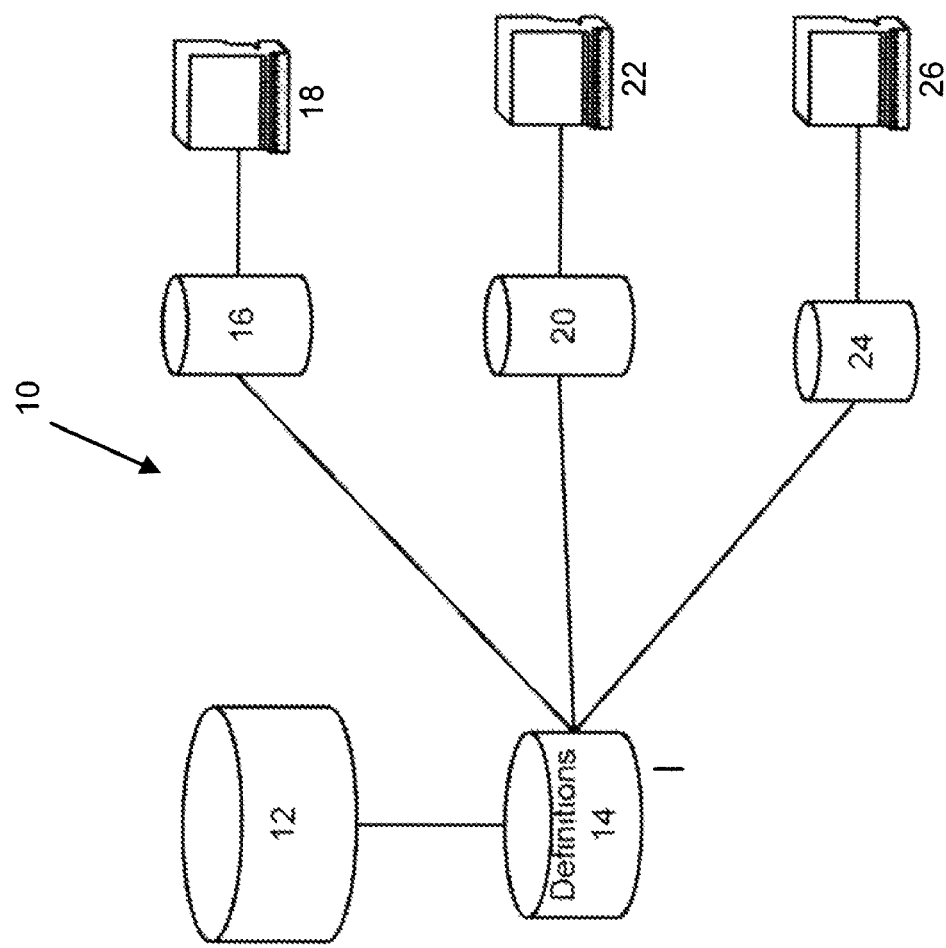
FIG. 1A is a block diagram illustrating aspects of a system incorporating features of the disclosed embodiments.

Referring to FIG. 1A, a block diagram of one embodiment of a system 10 incorporating features of the disclosed embodiments is illustrated. Although the disclosed embodiments disclosed are described with reference to the features shown in the drawings, it should be understood that the embodiments disclosed can be embodied in many alternate forms of embodiments.

FIG. 1A illustrates an exemplary structure or system 10 employing aspects of the disclosed embodiments. The system 10 includes a base application 12 and a library of definitions 14 related to the underlying or main application. The library 14 might also be referred to as the original source definitions. The library 14 generally includes all of the structure related to the underlying application 12.

The embodiments disclosed herein provide for creating interconnected instances of the library 14, as shown for example, can be located locally or remotely. In alternate embodiments any suitable number of instances can be formed.

As shown in FIG. 1A, a data store on repository 18 can be built, which will include copying the structure of the underlying application 12. Although data repositories 22 and 26 are shown as examples in FIG. 1, in alternate embodiments any suitable number may be formed. The data store 18 may be created for a specific purpose that may test the instances 16 of the definitions 14. As problems or changes are made to the instances 16, it might be desirable to update the original service structure. It may also be desirable to cascade these updates to other locations that have used the original source definitions. Using version control and tracking the use of instances and definitions can be used through different instances.

Thus, as shown in FIG. 1A of a definition is updated by user 18 in the instance 16, that updated definition can be promulgated back to the original source definition in the library 14. Using version control features the original source definition might be updated. By tracking other instances of the same definition, such as for example definition instances 20 and 24, these instances can be updated, so that the definition tested with respect to the data store or work area 18, can be reused by work areas 22 and 26. As illustrated with respect to FIG. 1A, all definitions are maintained under version control and each use is tracked. This enables the creation of more custom repositories, such as repository 18 and reduces the complexity of managing the change process.

Figure 1B:
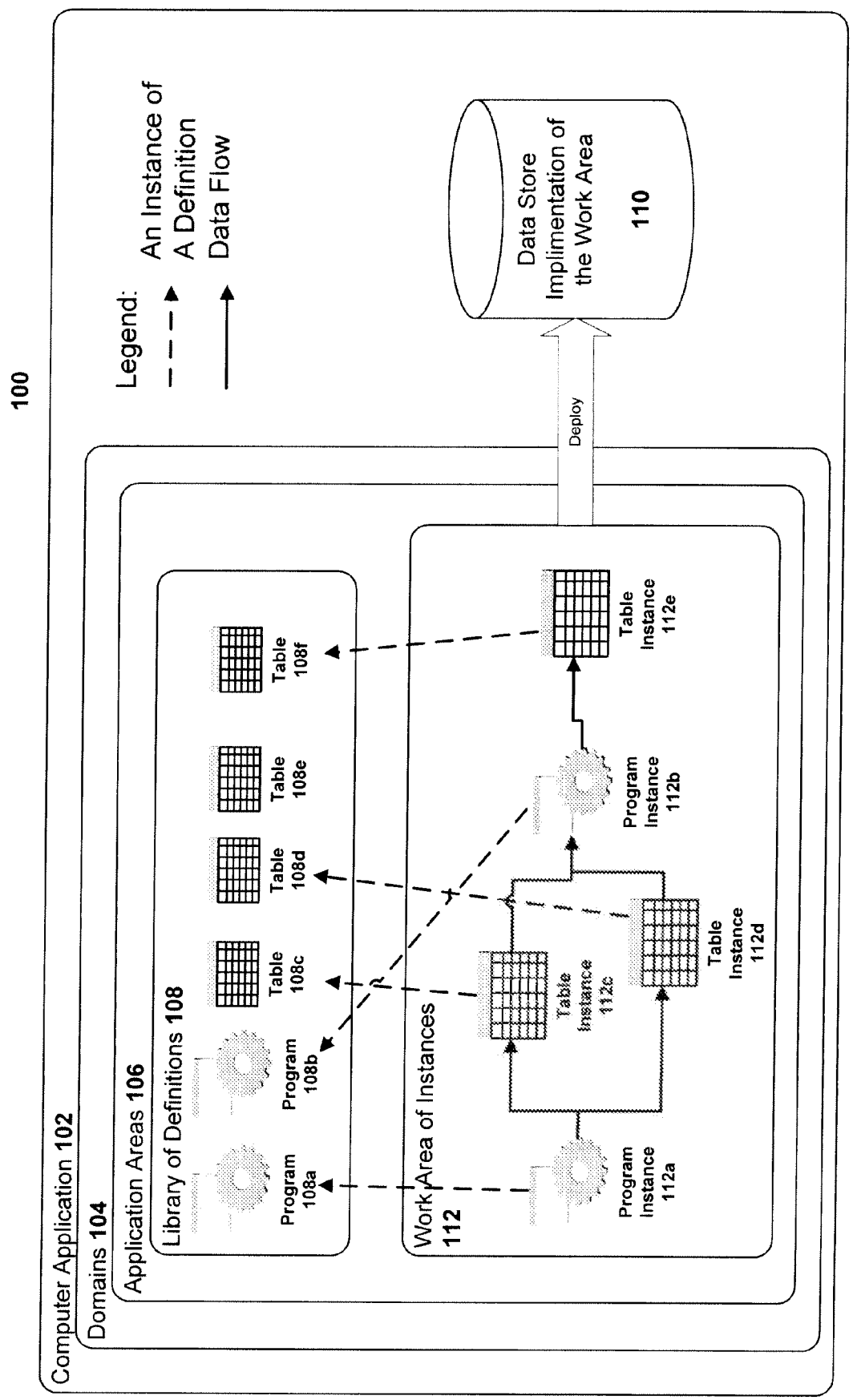
FIG. 1B is a block diagram of an exemplary system incorporating features of the disclosed embodiments.

FIG. 1B illustrates one embodiment of an application 110 built up of interconnected instances 112 of library definitions 108. Referring to FIG. 1B, in building or preparing a repository application 110, all of the structure of the underlying application 102 must be defined and stored in a library of definitions 108. A data repository usually comprises information and reports. Generally, this includes defining and storing the structures into a library 108 associated with the repository application 110. In one embodiment, these structures 108a-108f can include for example, but are not limited to, programs, reports, tables, table structures, variables, data marts, loads, source code, columns, parameters and visualizations.

Generally, in creating the repository application 110, each structure 108a-108f is defined once and stored in the library of definitions 108. Definitions allow the user to define data structures, loading programs, analysis programs and reports within a flexible hierarchy, for example. One example of such a hierarchy is Project=>Study=>Site. A work area of instances 112 can be created to access and utilize aspects of the repository application 110. As each one of the definitions 108a-108f stored in the definition library 108 is used by in a specific case or application 110, an object, such as Program Instance 112a, that points to the definition of the corresponding structure 108a in the library 108 is created or formed. In one embodiment, the object, such as 112a, that points to the definition of the structure 108a is called an instance. This allows the original definition 108a-108f to reside in one local, while creating a link or pointer to the physical local of the definition 112a-112e.

These objects 112a-112e may be created and managed at any appropriate level in the system, or may be created at one level and referenced at another level. For example, a data loading program in a given study could reference a standard load program defined at the project level. In alternate embodiments, any suitable number of project levels and hierarchies can be used.

In one embodiment, objects that can be managed can include for example, tables and column definitions, parameters for programs and reports; inputs and outputs for programs and reports, source code for programs and reports, including full version control, and report sets (indexed collection of individual reports). The user can instantiate definitions as a set of database tables, run one or more programs using the instantiated definitions, and review the results.

The repository 110 is developed and built up by interconnecting each of the structures needed or used for the specific application. Each definition 108a-108f and instance 112a-112e is maintained under version control and all relationships between instances and definitions can be tracked over time. In this manner, the user can see where a particular definition has been used. Changes or updates can be advanced back to the source definition. Since each definition 108a-108f is maintained in a library 108, with instances 112a-112e that connect the specific use to the definition, the same tested definition can be re-used through different instances.

By maintaining all of these definitions under version control and tracking exactly where they are used, the complexity of tracking changes and re-using objects is greatly reduced. A specialist is no longer required to manage the change process. By automatically tracking all the relationships of what is used where, the testing required is also greatly reduced. This change allows a company to prepare and maintain many more custom repositories.

Figure 6A:
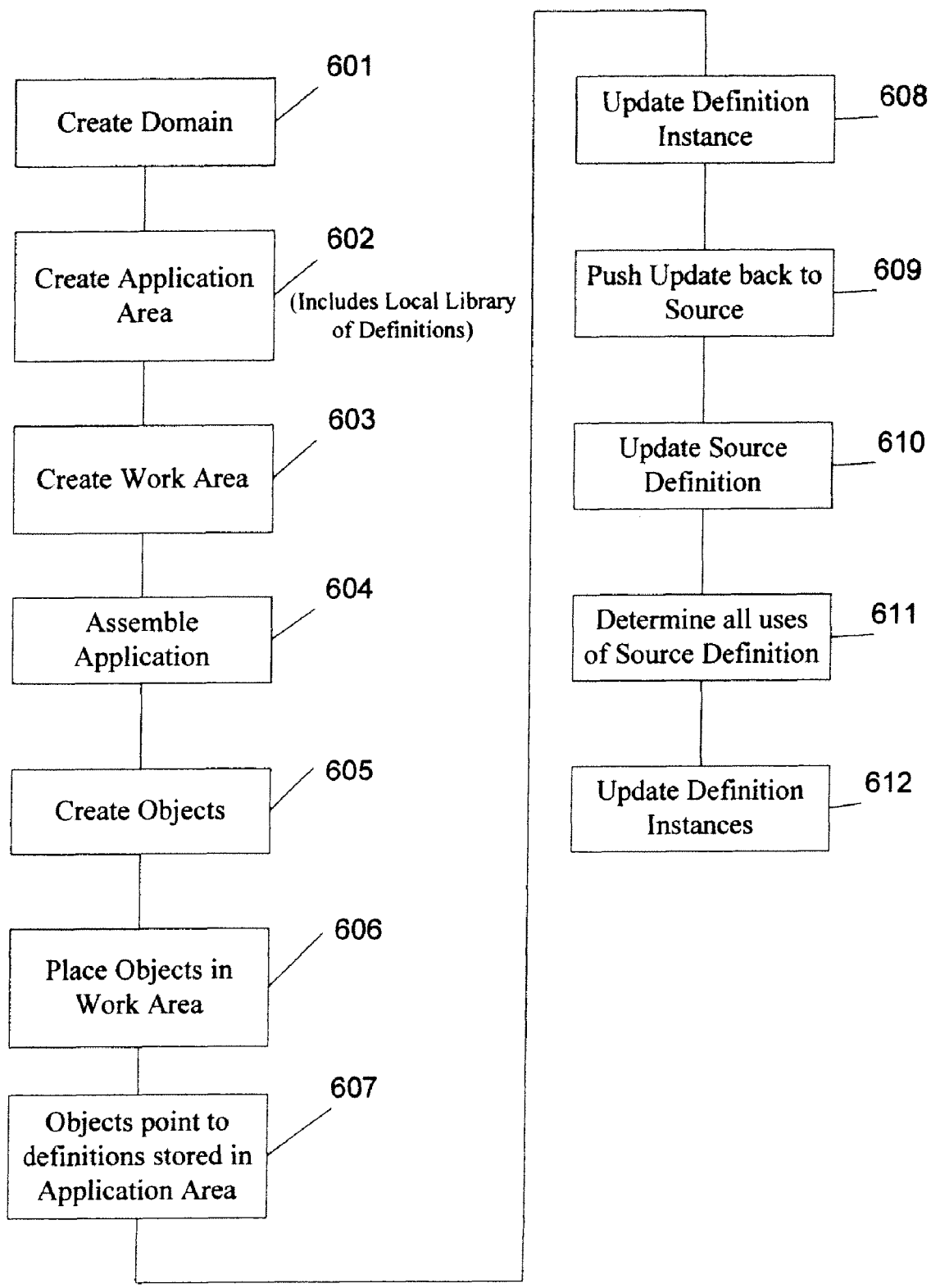
FIG. 6A is a flowchart illustrating aspects of an exemplary process incorporating features of the disclosed embodiments.
Figure 6B:
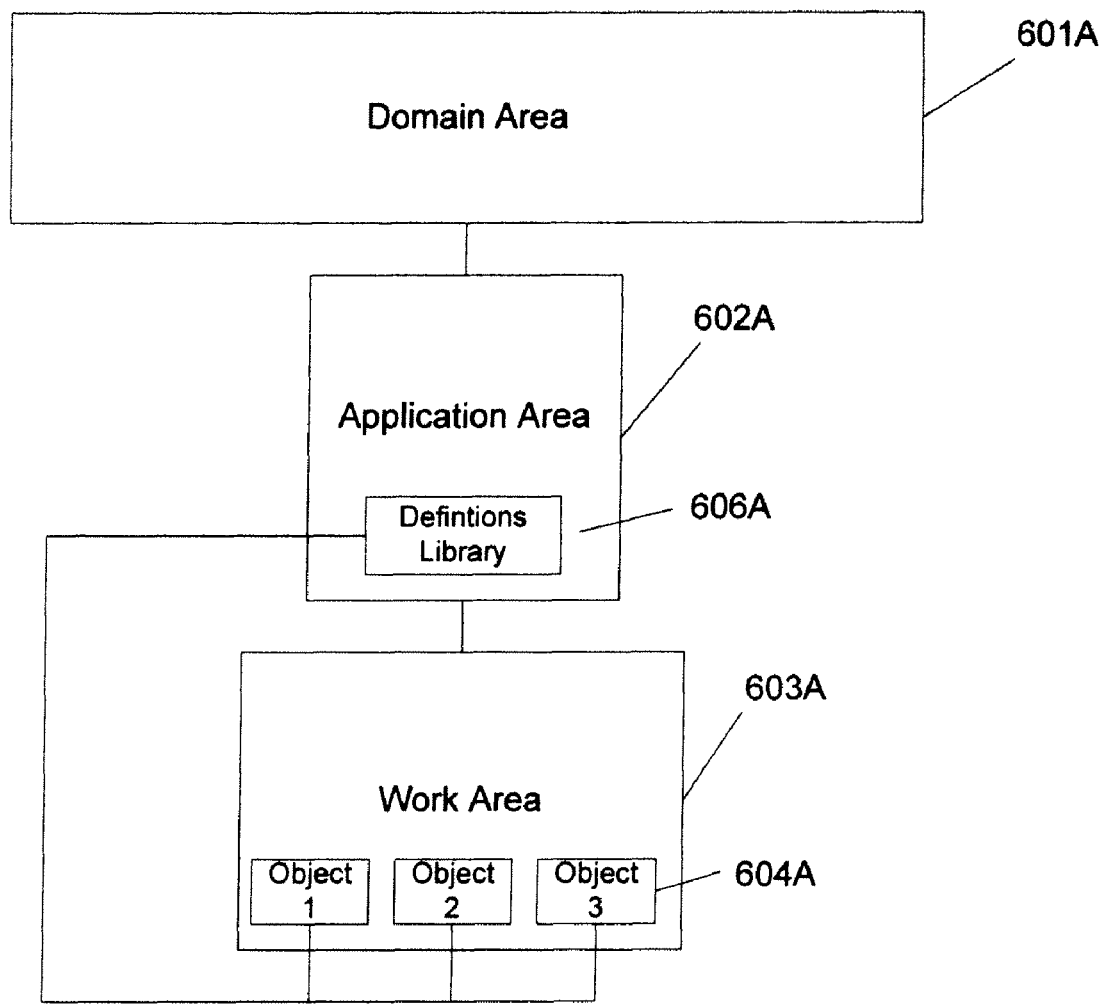
FIG. 6B is a block diagram of aspects of a system incorporating features of the disclosed embodiments.

For example, in one embodiment, referring to FIGS. 6A and 6B, when preparing or building a repository application, a domain area 601A is created 601. An Application area 602A, that includes a local library 606A of definitions, is created 602. A work area 602A is created 603 and the application is assembled 604 that includes defining and storing all of the structures 604A, B, C. As each definition is used to build the repository, an object 604A, B, and C that points to the definition of the structure is created 605. As the repository is built up, each of the structures 604A are placed in the Work Area 603A and interconnected 606. The original definitions are maintained in one local, the definitions library 606A, in the Application Area 602A. Each object 604A, B, C points 607 to the physical local of the definitions library 606A in 602A, which can be a different location or address from the respective objects.

As a particular definition instance is tested it can be updated 608. The updated is pushed 609 back to the source library. Using versioning or revision control methods, the source definition can be updated 610. Any suitable versioning method can be used, which can include aspects of for example, locking and user rights.

All uses of the source definitions are tracked over time. The uses are determined 611 and all instances of the definition, can be updated 612 to reflect the changes of the tested definition instance.

The disclosed embodiments allow the customer's existing employees to maintain their own specialized integration and reporting repositories without needing to hire technical IT specialists. This allows for much more business expertise to be housed in data repositories at lower cost than traditional warehousing solutions. The lower cost for repository construction and maintenance allows for better information delivery and decision support.

In one aspect, the disclosed embodiments can be utilized in the life sciences industry where there is a need to re-use company business logic for analysis and reporting of clinical data. For example, in one embodiment, the aspects of the invention relate to, and are applicable in a clinical data repository ("CDR"). The Clinical Data Repository generally features a consistent enterprise data model and infrastructure for integrating, storing and reporting clinical and related information. Users of the system may develop powerful analyses of the data, storing both the results and the logic used to derive the results back in the repository. Both the data and the analysis logic will have version control applied, thereby providing the regulatory controls required within the pharmaceutical industry. The users will have access to advanced tools for viewing and reporting on the data, and may post the output from such reports on one or more web sites. Authorized personnel, possibly including external organizations such as regulatory agencies may then view the output under full security control.

The CDR includes core features and core definitions of clinical data with the additional functionality of workflow, notifications, data visualization, data personalization/delivery.

Figure 2:
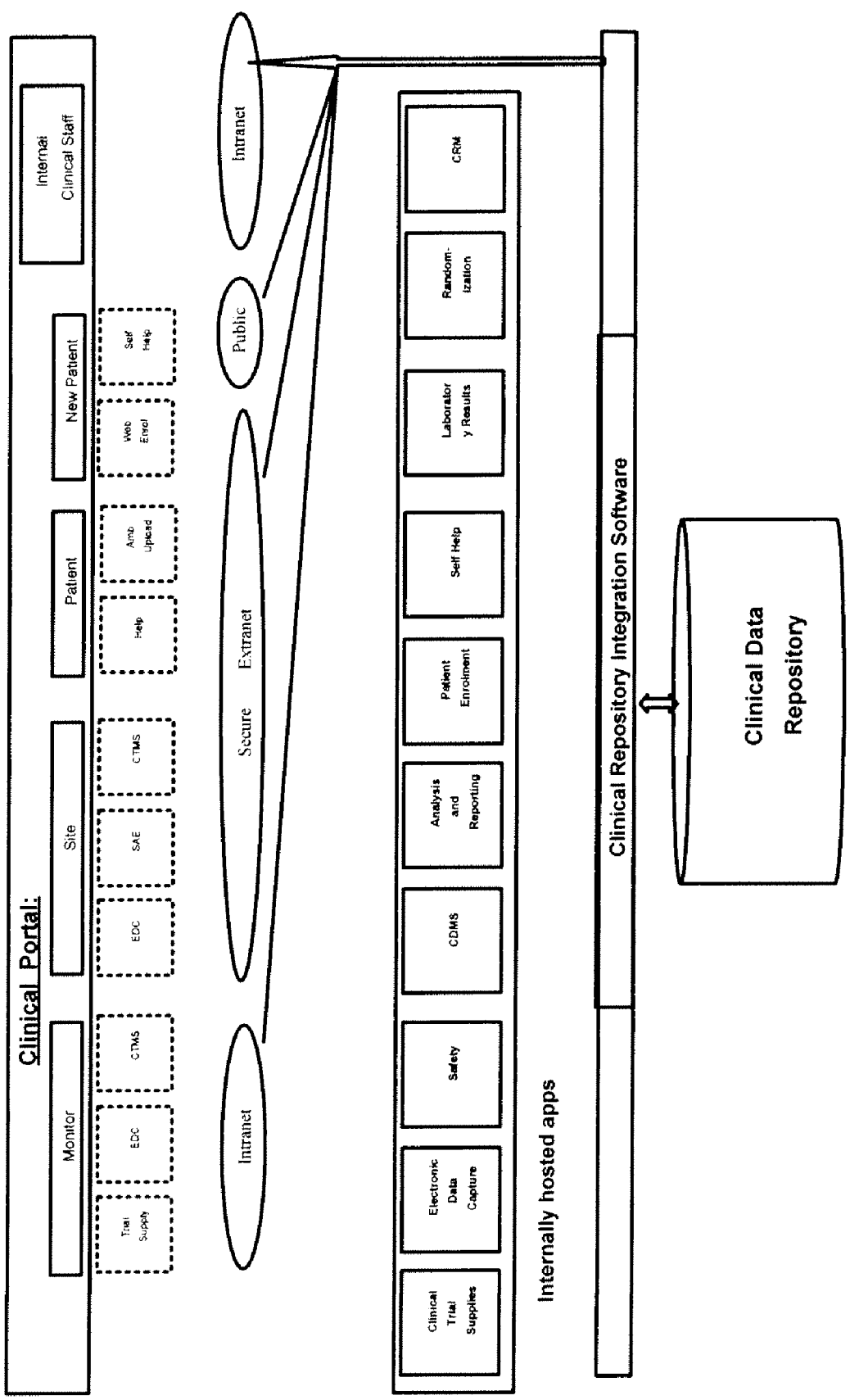
FIG. 2 is an illustration of an exemplary CDR system incorporating features of the disclosed embodiments.

FIG. 2 illustrates one embodiment of a clinical data repository system for information delivery. CDR supports business process and infrastructure required for simultaneously maintaining multiple sets of data for multiple purposes in various states of development, quality control and production.

CDR can be used to implement a large number of reporting and integration business applications layered on top of multiple sets of data. For example, a business application may be a particular set of interrelated reports and data marts for submission to a regulatory authority as part of a new drug application. Another business application might be a set of enrollment data and reports that show the current enrollment of patients by site, trial and project for all of clinical development.

The CDR Definition system is used to set up the applications and the sets of data for those applications that a company needs for its business processes. In addition, Definers use the CDR Definition system, to build the transformation and reporting programs, report sets, data marts, loading programs, workflows, and tables that populate and report on repositories.

All transformation and reporting programs, report sets, data marts, loading programs, workflows, and tables must be defined in CDR prior to using them. These are called primary definition objects. Since a company will have many of these definitions for different purposes, CDR will allow for organizing these objects in a meaningful way.

Figure 3:
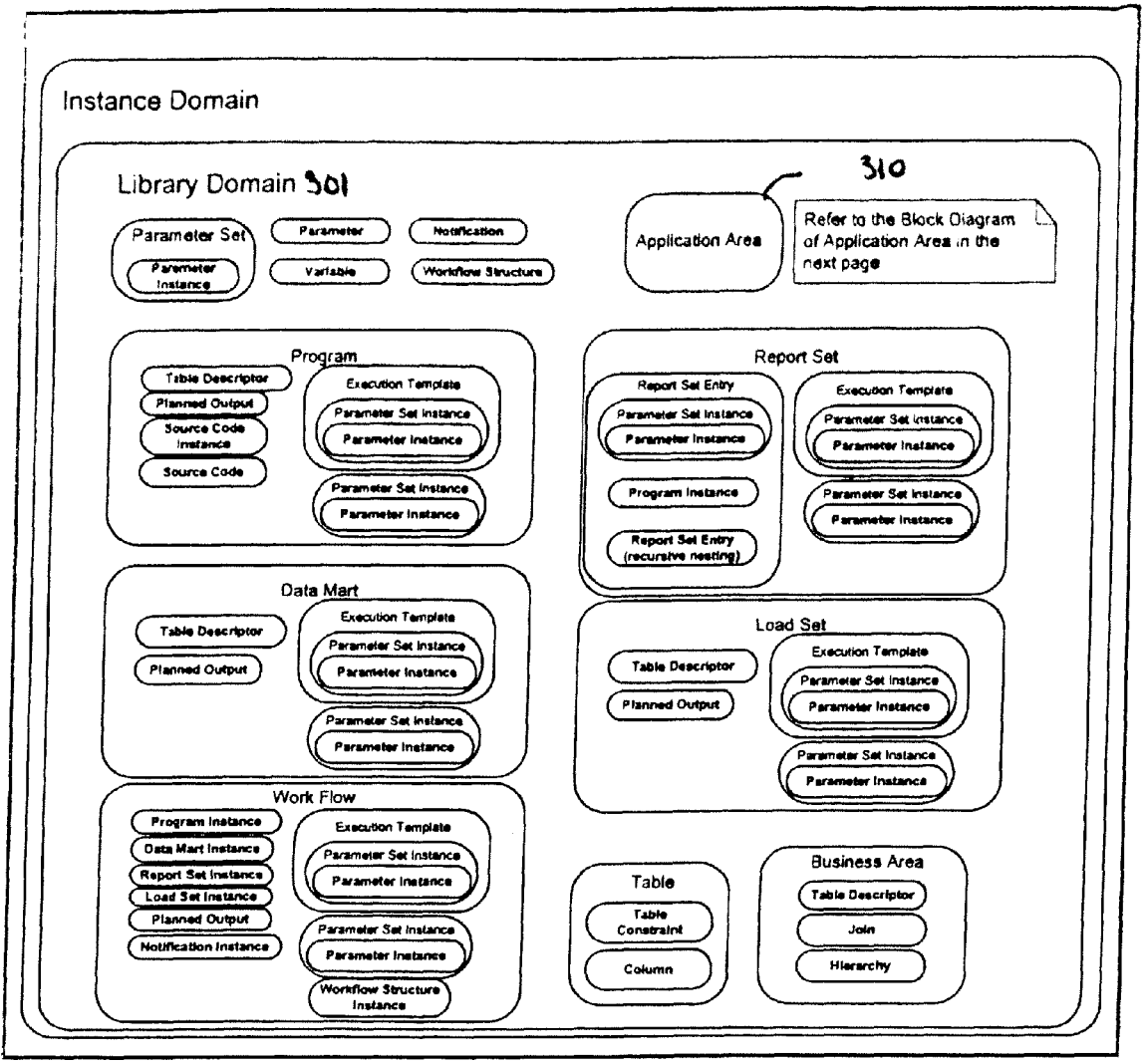
FIG. 3 is a functional diagram of an example of definitional object ownership in accordance with features of the disclosed embodiments.
Figure 4:
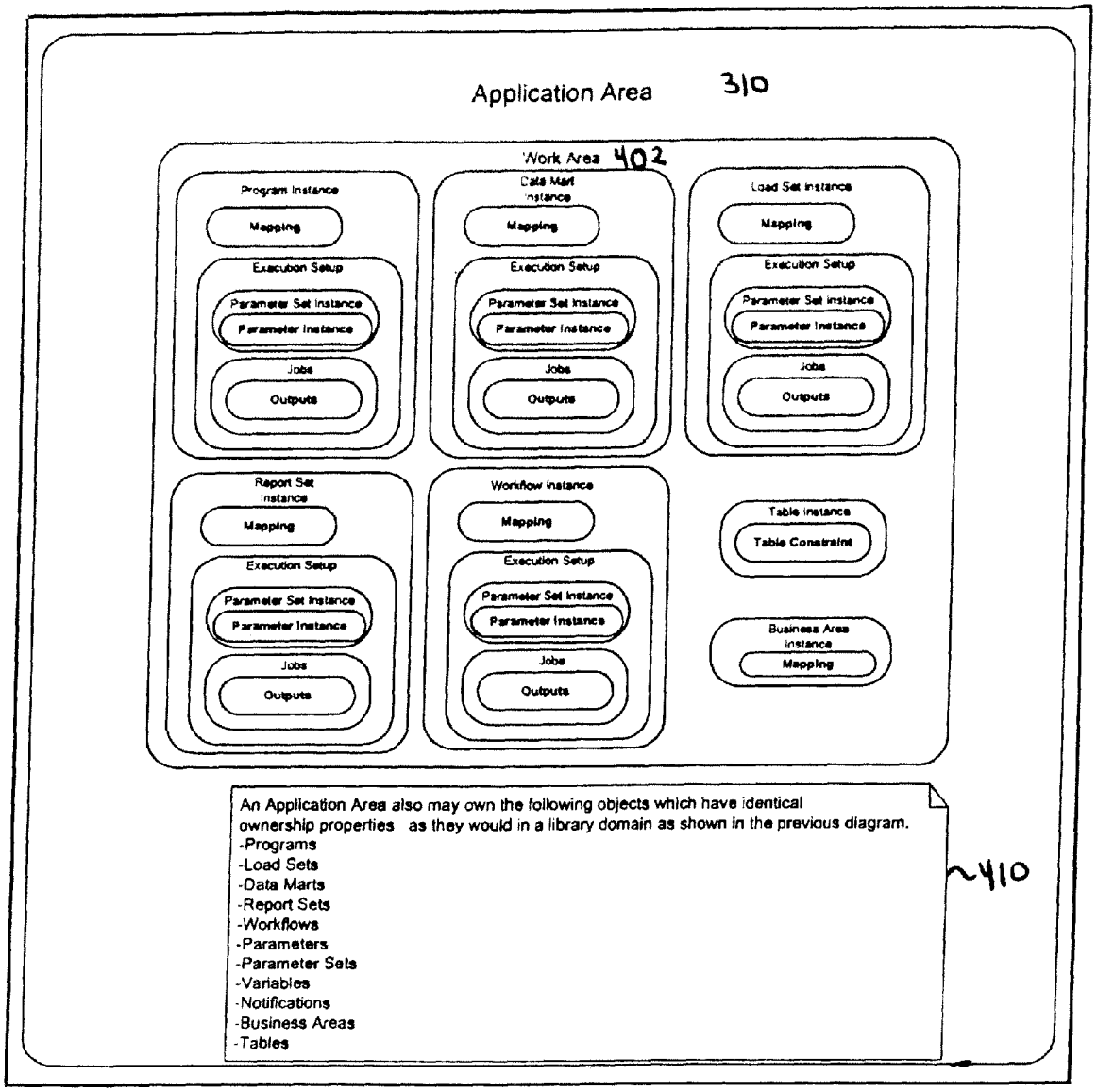
FIG. 4 is a diagram of another example of definitional object ownership incorporating features of the disclosed embodiments.
Figure 5:
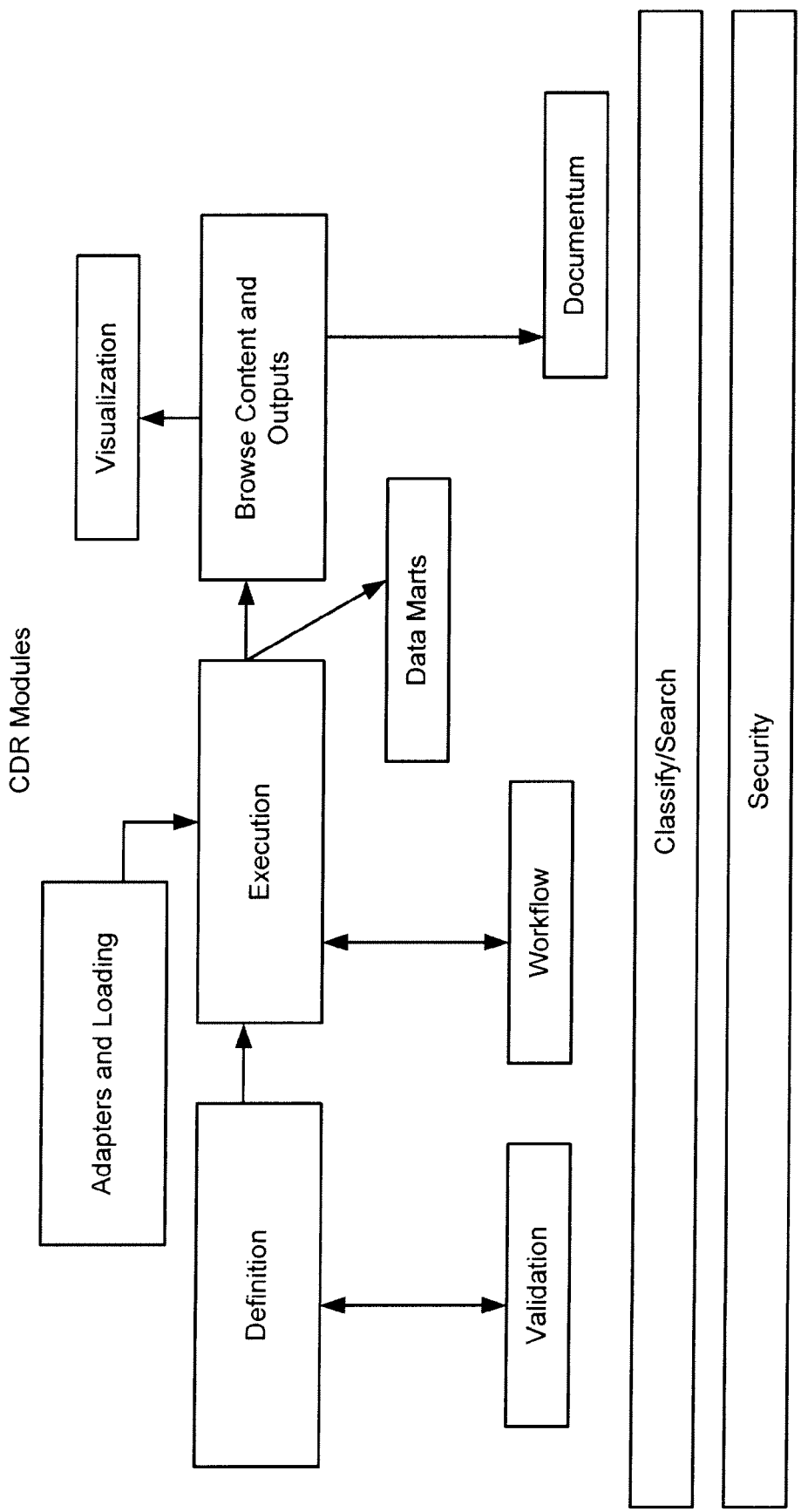
FIG. 5 is a block diagram illustrating CDR modules in a system incorporating features of the disclosed embodiments.

Referring to FIG. 3, CDR definitions belong to a user-defined domain that acts a container for interrelated business applications as well as a container for a library of definitions that can be re-used in multiple business applications. Each individual business application is contained in an object called an Application Area 310 that exists in a Domain 301. The Application Area 310 contains working copies of the business application in a sub-container called the Work Area 402, referring to FIG. 4. Work area 402 may contain different versions of the business application for different purposes. In one embodiment, the Work Area 402 corresponds to a single set of data in CDR. The application area 310 of FIG. 4 can include a library 410 of definitions that a Definer uses locally for the business application.

When a Definer builds a business application for the first time, he or she creates a Domain, if an appropriate one does not already exist, and creates an Application Area for that business application. Next, he or she creates a Work Area to contain a first version of the application for development purposes. Within the Work Area the Definer can then assemble the business application by connecting loads, transformation programs, tables, and other primary definitional objects. Rather than creating a copy of a definitional object each time it is used, when the Definer places the object in the Work Area, he or she is actually creating a pointer to the definition which itself resides in the one of the libraries. This pointer, as referred to herein, is called an Instance of the object. The Definer can select instances of primary Definition objects from the library of the Domain or Application Area if the definitions exist, or create them from scratch. When a Definer creates a primary object definition from scratch in a Work Area, the system actually places the definition in the local library in the Application Area and an Instance of that definition in the Work Area. The Instance acts as a window into the actual definition. This allows the same definition to be used in multiple Work Areas.

For example, a Definer sets up the safety analysis and reports needed for a clinical project's safety reporting. The Definer sets up one Domain to contain an Application Area for each trial and an additional Application Area for the summary of the individual trials at the project level. The Adverse Event report required for each trial is identical. The definer sets up and tests the Adverse Event report for the first trial, moves that report to the Domain's library, and creates instances of that Adverse Event report in each of the relevant Work Areas in the individual Application Areas for each trial. The Definer codes and validates once but can use the same report in multiple business applications. Once the Definer feels the Work Area is ready to test they can install the Work Area to the database and run data loads, transformations, reports, for example.

An important requirement for CDR is that any time a report output is produced or data is transformed, there should be a reconstructible set of programs available to reproduce the same data state at some indeterminate point in the future. For this reason, when a Definer installs a Work Area, all the relevant objects contained in the Work Area or any definitions pointed to by the instances in the Work Area must be frozen. CDR will handle this through a versioning mechanism. The system implicitly creates new versions of Work Areas and the object instances in a Work Area when an authorized user makes any change after the Work Area or any object instances have been installed. To modify an object definition, the Definer explicitly checks it out, creating a new version. This means only one person can change a primary definition at a time. Many users can simultaneously work in a Work Area. Secondary objects that are part of a checked out primary definition are implicitly checked out and versioned when a definer changes them. When the primary definition is checked in, the owned secondary objects are implicitly checked in. Secondary objects that belong to a primary definition cannot be modified if the primary definition is not checked out.

Tables in CDR are a hybrid between the metadata required to define tables in, for example, an Oracle™ database and the metadata required to define data sets in SAS. CDR tables include column definitions that have characteristics of Oracle™ table columns such as a name, length, data type, etc., and also contain SAS metadata such as SAS format, SAS name, and SAS label. Additionally, a table definition can include indexes, primary keys and check constraints.

By assembling a set of table instances in a Work Area, the Definer is essentially setting up a data store for that business application. Installation creates actual Oracle database objects that correspond to the definitions. Once the data is loaded and the transformation programs have been defined and run, these table instances are the store for the data for the Work Area's business application.

A table instance can serve as the target of only one executable, but can serve as the source for any number of executables, including executable instances in different Work Areas. CDR will contain reports based on these rules for showing all programs that have manipulated the data contained in a table instance. Foreign keys may be defined between table instances in a Work Area.

Definitions of executable objects must contain input and output tablelike structures that are mapped to the table instances the executable reads from and writes to. In CDR, these tablelike structures are called table descriptors and are pointers to the same table definitions that table instances point to. This means then when Definers assemble a business application in a Work Area, if the executables they are using are based on the same table definitions as the source and target table instances in the Work Area, the system can automatically map the executables to the table instances. A mapping utility will allow Definers to re-use validated programs even in cases where the structure of the actual table instance in the Work Area is slightly different from the table descriptors contained in the executable.

The Definer can automatically map table descriptors to table instances that will match by name. For example, if the Definer writes a program that has a source table descriptor called AE and there is a table instance in the same work area called AE, the table descriptor can automatically be mapped to the table instance. Once the user identifies that a table descriptor maps to a table instance either manually or automatically, CDR will try to automatically match up the columns. If CDR cannot automatically map the columns, the Definer must complete that mapping prior to installation.

All CDR executables contain table descriptors, including transformation and reporting programs, workflows, report sets, load sets, and data marts. In addition, business areas, which serve as the basis for visualizations, also use table descriptors to connect to CDR data.

Primary Definitional Objects are either executable or non-executable. The term executable refers to the ability to run the object's instances once they have been installed. For example, the following primary definition objects are executable:
Transformation programs
Reporting programs
Load sets
Data Marts
Report Sets
Workflows This leaves tables and business areas as the non-executable primary definitional objects. Tables have already been discussed above and business areas will be discussed in sections below.

The executable primary definition objects have a number of properties in common. They can all have runtime parameters as subcomponents of their definition. They also have one or more submittal forms associated with each instance to allow users to submit the instance for execution. These submittal forms, called execution setups, are presented to the user with the runtime parameters as the Definer has set them up. If the instance associated with a particular execution setup is installed, the user can submit the job to run.

Parameters are scalar values that can be passed to an executable object at runtime to control the flow of the underlying program. Each parameter is associated with a name, data type, length, default value, required flag, and SAS name. A parameter may also have a list of valid values, or can be validated by a PL/SQL packaged function that must conform to documented specifications. The list of valid values can either comprise a set of fixed, user-defined values, be generated from a company-specific classification hierarchy level such as a list of studies, or be generated via a custom user-supplied PL/SQL packaged function that must conform to documented specifications. A parameter's programmatically generated list of values and validations can make reference to other parameter values as long as they exist in the same primary definitional object. Parameters are stored in libraries even though they are not primary definitional objects. This allows for parameter re-use. When a Definer uses a parameter in a definition they are actually creating a pointer to that parameter in the library.

Each instance of an executable primary definitional object must have at least one execution setup defined. The execution setup contains all the parameters used in the underlying definition. The Definer may change the parameters' default values, list of values, or validation rules specifically for use in the execution setup, if required. The Definer can also hide parameters or mark them read-only. The Definer can also set up the security for who is allowed to submit the execution setup. Optionally, if the Definer has modify rights on the primary definitional object, he or she can save an execution setup back into the primary definitional object as an Execution Template. The execution template can then be used as a starting point for creation of other execution setups that are based on the same primary definitional object. This allows for sharing and standardization of submittal forms across multiple instances of a particular primary definitional object.

Executable primary definitional objects can be divided into two groups: simple and compound. Simple primary definitional objects are:
Transformational programs
Reporting programs
Load sets
Data Marts
Compound primary definitional objects are:
Report Sets
Workflows Since SAS, PL/SQL, and Oracle Reports can transform and report on data, and do both at the same time, transformations and reports are combined into a single primary definitional object called a program. The term used in CDR for a data-loading object is load set.

Simple primary definitional objects are the core building blocks for manipulating data and generating report outputs.

Programs are simple primary definitional objects that transform data from input tables to output tables and/or generate output files for reporting. Definers create a program by supplying the technology type and defining the four main subcomponents. The technology type determines the behavior, language used, and runtime engine for the program. The technology types available are:
Oracle PL/SQL
Oracle*Reports
SAS program
SAS macro
SAS format
The four main subcomponents are:
Table Descriptors
Parameters
Source Code
Planned Outputs The table descriptors are the input and output tablelike structures that the source code reads from and writes to. Parameters are used within the source code to control the flow of the program.

Source code is one or more files of the specified technology type that actually manipulate the data. For PL/SQL these are SQL files; for SAS programs, macros, or formats, they are SAS files. For Oracle*Reports they are report definition files.

These files are created in the normal Integrated Development Environment (IDE) of each technology. For SAS-based technology types, when the Definer launches the IDE from CDR, the SAS environment will start on the client and the source code, if any exists, will also be placed on the client. The Definer can see the data in CDR that exists in the table instances that are mapped to the program's table descriptors as either SAS views or SAS datasets. If the needed tables and views have not yet been installed in the Work Area, CDR will automatically perform a partial install of the required objects prior to launching the IDE. The Definer can then run the program as needed during development and upload the source code when it is ready. When the Definer wants to test a program definition, he or she can upload the source code files to CDR, install and run the program, and check the results. Oracle*Reports works similarly.

Based on user preference, a Definer can launch SAS from CDR in one of three different modes. Connected mode uses the "SAS/Access to Oracle" option that allows the Definer to directly see data in CDR via SAS views. In disconnected mode, data is downloaded as data sets and no connection from SAS to Oracle is required. In server mode the files are downloaded to the designated Unix server and the user can develop a program using SAS in a Unix environment.

If the Definer would like to use standard source code that exists in another program, he or she can add that source code file to his or her current program by reference. For example, to use a standard SAS macro catalog within a new program, a Definer must locate the appropriate SAS macro program in CDR and reference it with a second source code definition. He or she can then make calls to that macro library in the program's main source code. The Definer cannot change the content of the referenced source code; only use it.

There is a special case of including standard source code called a static source code. When a source code is included by static reference, the user must select a specific, already existing instance of a program that contains the source code they would like to include. In this case, any tables that are being used by the program instance from where the source code was referenced will be automatically mapped to the current program as sources. For example, a standard program may contain the source code for converting from one unit to another. That program gets its conversion factors from a lookup table. If this standard unit conversion source code were included in new program as a static source code, the unit conversion table would automatically be mapped as a source the new program.

Planned outputs are the output files that the Definer expects to generate as a result of running the program. These can include the main report being produced or outputs such as error or log files. These planned outputs are declared so they can be classified and secured ahead of time during definition rather than each time they are produced.

Load sets are simple primary definitional objects that load data from external adapted systems into CDR tables. Definers create a load set by supplying the adapter type and target table descriptors for the load. When the Definer initially creates a load set, he or she must select the adapter type. The adapter type determines the source system from which the data will be loaded. Depending on the adapter, other attribute information for the load may be required.

For example, to load data for Oracle Clinical Patient Data Extract SAS Views the Definer must supply the owning location, clinical study and study access account, and an Oracle Clinical view name for each table descriptor. For a SAS data set, the user must supply the name of the dataset to be loaded at job submittal time.

Once the Definer creates a Load Set instance in the Work Area and maps the load set target table descriptors to the Work Areas table instances, the load set is ready to be installed and run.

Data marts are simple primary definitional objects that convert data from CDR tables into files that are commonly recognizable by external systems. Definers create data marts by supplying the data mart type and the source table descriptors for reading the data to be converted to files. When the Definer initially creates a data mart, he or she must select the data mart type. The data mart type determines the target technology or file type where the data is placed. Depending on the data mart type, additional attribute information may be required for the generation of the data mart.

For example, when creating a SAS data mart, the Definer must decide if the data mart will be using SAS data sets or one of the SAS transport formats.

Once the Definer creates a data mart instance in the Work Area and maps the data mart's source table descriptors to the Work Area's table instances, the data mart is ready to be installed and run. When the user submits a data mart to run, in addition to other parameters, he or she can specify whether or not to bundle the separate files generated by the data mart into a single zip file.

Compound primary definitional objects are made up of organized collections of simple primary definitions and, when run, conditionally execute the simple definitional objects in pre-determined order. The two types of compound definitional objects are report sets and workflows.

To create a report set or workflow, a Definer adds pointers to simple definitional objects and then connects the simple definitional objects together. The result is a single executable object that runs multiple simple objects.

Report Sets are compound definitional objects that contain multiple programs. Each program, when it runs, produces a planned output (report) that will be inserted into the final report set output. This allows for programs that run on different data and for different purposes to be presented to the user as one large report with a table of contents and separate chapters and subchapters corresponding to the simple program outputs.

Each chapter or subchapter is called a report set entry. A report set entry may be associated with a program, and may contain additional report set entries that act like subchapters. Additionally, a report set entry can have a block of text called a narrative displayed either before or after the program report's output is displayed. As the Definer arranges the report set entries in the report set definition, the entries can be moved, re-ordered, copied and modified as needed. Additionally, the chapter numbers can be autonumbered or manually numbered. CDR will include a post-processing program to run after each report set execution on the outputs of all the individual programs contained in the report set. This post-processing job will concatenate the pages of the individual program outputs; repaginate; add bookmarks, cross references, watermarks, titles, and boilerplate images; and generate a single PDF output for the result of the report set. Each report set entry will have a set of parameters to set the properties of this post-processing job. When the Definer builds the report set they can specify the default properties for these parameters. The Definer can then override these properties when an execution setup is created for the report set instance. If the post-processing job is not requested then each output and narrative is stored separately and is accessed via a table of contents that include all sections of the result of running the report set.

When a Definer creates an instance of a report set in a Work Area they will need to map each table descriptor in from each simple program being used in the report set to a table instance. They can then install and run the report set. When running a report set the user can select some or all of the chapters.

Workflows are compound definition objects where separate programs, load sets, data marts, and report sets are arranged in a fixed order. These components are connected with workflow transitions. A transition has a source and a target, as well as a condition under which the transition will be activated.

For example, if the Definer would like a workflow that that first loads data using load set LS1 and then transforms and reports on the loaded data using program P1 when the load successfully completes, the Definer could set up workflow WF1 that has the LS1 load set and P1 program as components and then create a transition from LS1 to P1 on the condition of success being returned from LS1. The possible return codes for the purpose of conditional transitions are SUCCESS, WARNING, and FAILURE.

In addition to the definition objects listed above, a workflow can have a workflow-specific object used to control its flow called a notification. There are two types of notifications, FYI (For Your Information) and Approval. In both cases, the Definer specifies recipients by a combination of their role and user group (not by name). When a workflow transitions to a FYI notification, the text body of the notification is routed to the recipient(s). Processing immediately moves to the next transition point. When the notification is of type Approval, the text body of the notification is routed to the recipient(s) but processing does not continue until the notification is approved or rejected by the recipient. Definers specify whether approval is required by one or all recipients. The processing will continue based on the next transition and the condition of Approved or Rejected. Notifications can be sent via e-mail or within CDR based on user preferences.

With splits and joins, a workflow can have its components running in serial or parallel or a combination of serial and parallel.

When a data mart is part of a workflow, the zip file that contains the data mart may also contain other report outputs that were generated earlier in the workflow process. For example, this feature would allow for the zip file to contain both the data from the data mart plus some text outputs that have the source code that was used by programs to prepare the data in the data mart.

Business areas are definitional objects containing table descriptors that map to a set of table instances, and which define relations among the tables with joins and hierarchies. Installed business area instances drive the creation, maintenance and security of the Discoverer Metadata Repository. A user with read data access to an installed business area will be able to create and maintain Discoverer Workbooks with access to the same data, through the standard Discoverer interface.

Business area definitions, like other primary object definitions, are re-usable; a Definer can create multiple instances of the same business area definition in different Work Areas.

All primary object definitions and instances of them will be associated with a validation status. Work Areas will also have a validation status. The validation status of a definition object is used to help control the quality of object definitions and to track that control for regulatory compliance.

There are four possible validation statuses for definitional objects:
Development
Quality Control
Production
Retired When a new version of a definitional object is created, it will automatically receive the Development validation status. Once an object has moved beyond the Development status, any changes applied to that object will require a new version of that object through either implicit or explicit version control.

A Definer can store supporting documents and job results related to validation with the object. These documents and job results may be used as part of a company's standard operating procedures for developing programs and applications. The documents will be kept under version control by CDR.

Object instances can be assigned a validation status equal to or less than, but not greater than, the validation status of the underlying definition.

The purpose of the CDR Definition system is to allow a Definer to build a set of applications that load, transform, and report on data. The Definer creates these applications by using encapsulated definitions contained in general or local libraries.

The CDR definitional environment consists of a set of objects for developing, managing, and organizing programs and related meta-data structures. Some of the objects are listed and described below. In alternate embodiments, any suitable object can be utilized within the scope of the invention.

There are a number of CDR Primary Definitional Objects. These are the main definitions of objects to be managed through the CDR definition interface. Some examples of CDR Primary Definitional Objects can be seen in the table below.

TABLE 1

CDR Primary Definitional Objects

| CDR Primary Definitional Object Type | Description |
| --- | --- |
| Business Area | A collection of Tables that act as the foundation for defining visualizations. |
| Data Mart | A collection of Tables to be prepared for moving to a file system |
| Load Set | A machine-supplied, user-configurable program that loads data from a remote system to Table(s) in CDR |
| Program | A user-written program that can transform and/or report on data |
| Report Set | A collection of Programs that are combined in a single definitional object with a Table of Contents for common execution and capable of producing either multiple outputs or a single integrated output |
| Table | A metadata description of a table-like object (for example a Oracle view or a SAS dataset) |
| Workflow | A collection of programs, notifications, Data Marts, Report Sets, and load sets that are conditionally executed in a user-defined order in a combination of parallel and serial executions |

There are also a number of CDR Secondary Definitional Objects. The CDR Secondary Definitional Objects are used by the CDR Primary Definitional Objects to help complete the details. These may be thought of as sub-components of the CDR Primary Definitional Objects. Some examples of CDR Secondary Definitional Objects are in the table below.

TABLE 2

CDR Secondary Definitional Objects

| CDR Secondary Definitional Object Type | Description |
| --- | --- |
| Execution Setup | A complete group of the partly or completely bound runtime parameters of a Program, Report Set, Load Set, Workflow, or Data Mart used to initiate a job |
| Execution Template | A copy of an Execution Setup that is stored in a primary definition for re-use |
| Hierarchy | A collection of table Columns the is used by a Business Area for drilling down in a visualization. |
| Job | An object that controls and records the results of submitting an Execution Setup. |
| Join | A definition of how two Table Descriptors in a Business Area are joined via Column mappings for the purpose of visualizations. |
| Mapping | A link by table and Column between a Table Descriptor and a table Instance |
| Notification | The meta-data for a message sent to a user during the execution of a Workflow. The message may or may not require approval from the user before the Workflow can proceed. |
| Parameter Set | A collection of interrelated Parameters |
| Planned Output | A meta data representation of the intended output of a Program, Data Mart, Report Set, or Workflow |
| Report Set Entry | An object used in a Report Set that contains a program Instance and or additional Report Set entries used to organize the table of contents of a Report Set. |
| Source Code | An object for identifying Source Code used in a Program |
| Table Constraint | A Constraint on the rules for a Column or set of Columns in a Table or Table Instance, Constraint similar to an Oracle Column, Table, or Foreign Key Constraint |
| Variable | An instance of a Table read from or written to by a Program, Data Mart, Load Set. |
| Workflow Structure | An object that controls the flow of a Workflow process |

In addition to the CDR Primary and Secondary Definitional objects there is also a set of objects called CDR Organizational Definitional Objects that are used to help organize and re-use both CDR Primary and Secondary Definitional Objects. Some examples of CDR Organizational Definitional Objects are listed below.

TABLE 3

CDR Organizational Definitional Objects

| CDR Organizational Definition Object types | Description |
| --- | --- |
| Instance Domain | A container that contains all definitional objects within a CDR instance. This is the parent container for all objects that are owned by the current instance. |
| Library Domain | A container that is used to store CDR object definitions and applications |
| Application Area | A container that is used to store, manage, and control a specific business application implemented within CDR. |

TABLE 3-continued

CDR Organizational Definitional Objects

| CDR Organizational Definition Object types | Description |
| --- | --- |
| Adapter Domain | Similar to a Library Domain, the Adapter Domain stores definitions and applications that control the integration of external technologies and systems |
| Adapter Area | Similar to an Application Area, the Adapter Area stores definitions and a single application that controls the integration of an external technologies or system |

In order to maximize re-use of a CDR Primary or Secondary Definitional object, when an object is used in another object, it does not physically include a copy of the definitional object itself. A CDR Instance object acts as an intermediary to the original definitional object. Some examples of relationships between CDR Instances and their corresponding definitions are shown below.

TABLE 4

CDR Instance Definitional Objects

| CDR Instance Definitional Object type | Object Type Instantiated |
| --- | --- |
| Business Area Instance | Business Area |
| Column | Variable |
| Data Mart Instance | Data Mart |
| Load Set Instance | Load Set |
| Parameter | Variable |
| Parameter Instance | Parameter |
| Parameter Set Instance | Parameter Set |
| Program Instance | Program |
| Report Set Instance | Report Set |
| Source Code Instance | Source Code |
| Table Descriptor | Table |
| Table Instance | Table |
| Workflow Instance | Workflow |
| Notification Instance | Notification |
| Workflow Structure Instance | Workflow Structure |

Examples of additional Definitional Objects that CDR uses to build applications and are described in the table below.

TABLE 5

Miscellaneous Definitional Objects

| CDR Object Type | Description |
| --- | --- |
| Work Area | A container of interconnected primary object instances that when installed, contains the actual data and programs that make up an application in a specific state. |
| Output | The binary output that is the result of running an installed program, Data Mart, load set, Worktlow, or Report Set, i.e. a report output. |

Once the required CDR Primary Definitional objects are defined and instantiated in a Work Area, the Work Area may then be installed. For each CDR Primary Definition object instantiated in the Work Area, the corresponding installed CDR instance object will contain the actual source install/upgrade code for installing or upgrading the database with the contents of the CDR Primary Definitional object.

By fully specifying a set of related CDR Primary Definitional objects in an Application Area or Library Domain, creating Work Areas and instantiating these primary objects, and installing the Work Area, the CDR definer will have complete control over the definition of the business applications implemented within CDR.

Figure 7:
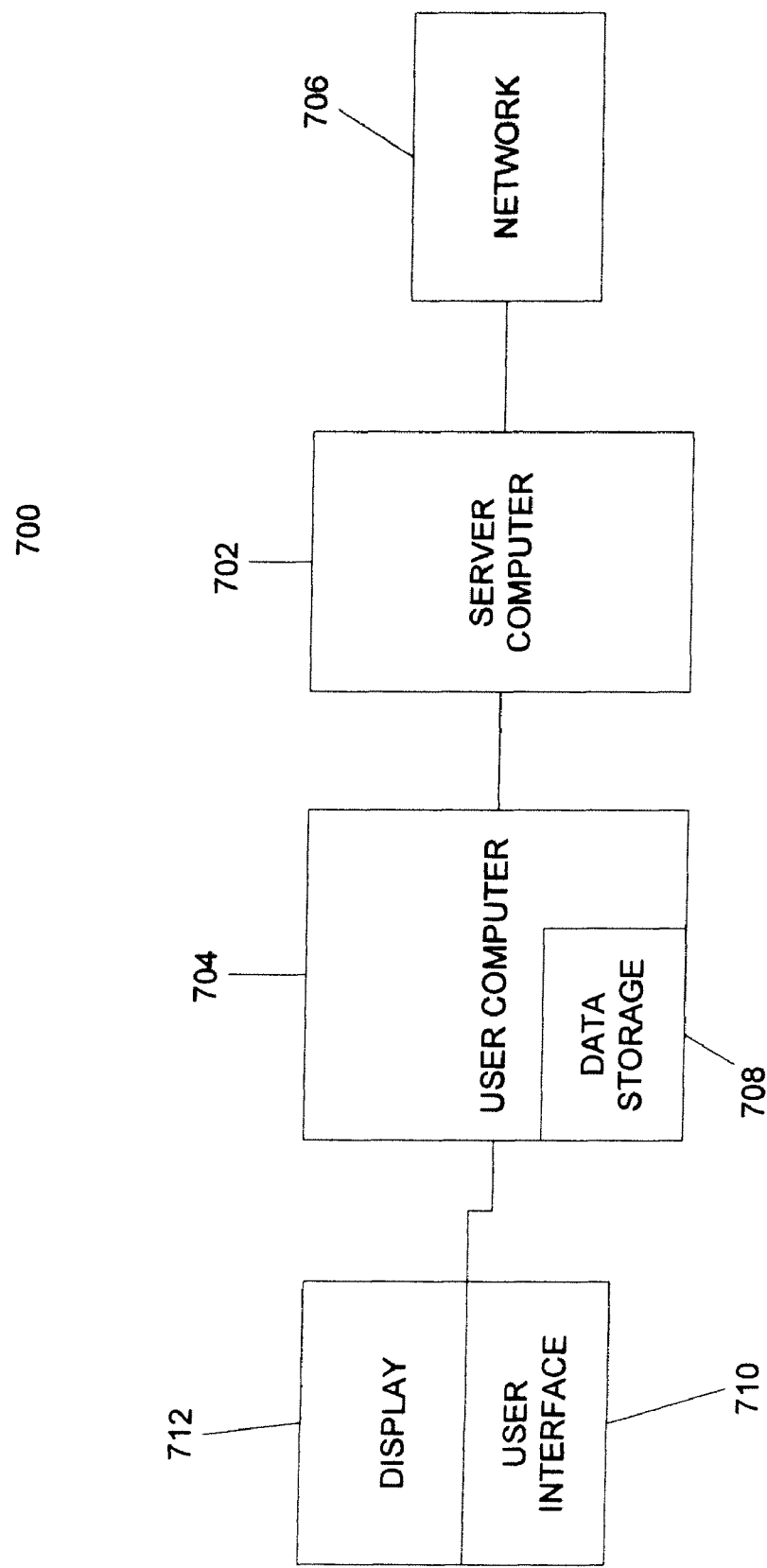
FIG. 7 is a block diagram of aspects of an exemplary architecture that can be used to practice aspects of the disclosed embodiments.

The disclosed embodiments may also include software and computer programs incorporating the process steps and instructions described above that are executed in different computers. In one embodiment, the computers are connected to a network, such as for example the Internet. However, in alternate embodiments the computers can be connected to, or via, any suitable network. FIG. 7 is a block diagram of a typical apparatus 700 that may be used to practice the aspects of the disclosed embodiments. As shown, a computer system 702 may be linked to another computer system 704, such that the computers 702 and 704 are capable of sending information to each other and receiving information from each other. In one embodiment, computer system 702 could include an origin server or computer adapted to communicate with a network 706, such as for example, the Internet or an Intranet. Computer systems 702 and 704 can be linked together in any conventional manner including a modem, hard wire connection, fiber optic link or such other suitable network connection. Generally, information can be made available to both computer systems 702 and 704 using a communication protocol typically sent over a communication channel or through a dial-up connection on ISDN line. Computers 702 and 704 are generally adapted to utilize program storage devices embodying machine readable program source code which is adapted to cause the computers 702 and 704 to perform the method steps of the disclosed embodiments. The program storage devices incorporating features of the invention may be devised, made and used as a component of a machine utilizing optics, magnetic properties and/or electronics to perform the procedures and methods of the invention. In alternate embodiments, the program storage devices may include any suitable storage media, such as for example, magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 702 and 704 may also include a microprocessor for executing stored programs. Computer 702 may include a data storage device 708 on its program storage device for the storage of information and data. The computer program or software incorporating the processes and method steps incorporating features of the invention may be stored in one or more computers 702 and 704 on an otherwise conventional program storage device. In one embodiment, computers 702 and 704 may include a user interface 710, and a display interface 712 from which features of the invention can be accessed. The display interface 712 and user interface 710 could be a single interface or comprise separate components and systems. The user interface 708 and the display interface 712 can be adapted to allow the input of queries and commands to the system, as well as present the results of the commands and queries.

The disclosed embodiments allow a user to define all structures once. As instances of the definitions are created and used, objects are formed that link the instance to the definition of the structure. A repository is built that interconnects all the structures for a specific use. The use of each definition is tracked and each definition and instance is maintained under version control. The user can see where a particular definition has been used, and the same tested definition can be re-used through different instances.

It should be understood that the foregoing description is only illustrative of the invention. Various alternatives and modifications can be devised by those skilled in the art without departing from the invention. Accordingly, the disclosed embodiments are intended to embrace all such alternatives, modifications and variances which fall within the scope of the appended claims.

What is claimed is:

1. A method of definition control in a data repository application comprising:
    defining structures for the data repository application;
    storing each structure and a source definition corresponding to the structure in a definitions library;
    as the source definition for each structure stored in the definitions library is used in an instance of the source definition, creating an object that points to the source definition;
    interconnecting each structure for which the object is created;
    building the data repository application for a specific use that includes each of the interconnected structures;
    automatically tracking instances of the source definition; and
    in response to a change made to the instance of the source definition, automatically updating the source definition with the same change made to the instance of the source definition and using the updated source definition to automatically update all instances of the source definition, wherein automatically updating the source definition includes automatically promulgating back the change made to the instance of the source definition to the source definition, and wherein automatically updating all instances of the source definition includes automatically cascading the updated source definition to update all instances of the source definition.

2. The method of claim 1 further comprising before the automatically updating, testing the instance of the source definition and causing the change made to the instance of the source definition based at least in part on the testing.

3. A system for providing definition control in a data repository application comprising:
    a first non-transitory storage medium containing at least one repository application area;
    a second non-transitory storage medium containing a definitions library area related to an underlying application, the definitions library area configured to include source definitions and structures related to the underlying application;
    a work area in communication between the at least one repository application area and the definitions library area, the work area configured to provide a link from each source definition stored in the definitions library area and an object related to a use of a source definition coupled to the at least one repository application area and interconnect each instance of a source definition and each structure within the work area;
    a definition tracking system configured to monitor relationships between each instance of the source definition within the definitions library area and to track each source definition used in the work area as an instance of the source definition; and
    a definition updating system configured to receive definition changes from the work area when the definition changes are made to the instance of the source definition, to automatically push back the definition changes made to the instance of the source definition to the source definition in the definitions library area and automatically update the source definition in the definitions library area with the same definition changes made to the instance of the source definition, and to automatically cascade the updated source definition to update other instances of the source definition.

4. The system of claim 3 further comprising a version control system to maintain each source definition and each instance of each source definition under version control.

5. The system of claim 3 wherein an origin of the definitions library area is in one locale and an origin of each use of each source definition is in another locale.

6. A non-transitory computer readable medium storing instructions that, when executed by at least a processor of a computer, cause the processor to perform operations, the instructions comprising:
computer readable code embodied therein for causing the computer to provide definition control in a data repository application, the computer readable code stored in the non-transitory computer readable medium comprising:
computer readable program code for causing the computer to define structures for the data repository application;
computer readable program code for causing the computer to store each structure and a source definition corresponding to the structure in a definitions library;
computer readable program code for causing the computer to create an object that points to the source definition as the source definition for each structure stored in the definitions library is used in an instance of the source definition;
computer readable program code for causing the computer to interconnect each structure for which the object is created;
computer readable program code for causing the computer to build the data repository application for a specific use that includes each of the interconnected structures;
computer readable program code for causing the computer to automatically track instances of the source definition; and
computer readable program code for causing the computer to, in response to a change made to the instance of the source definition, automatically update the source definition with the same change made to the instance of the source definition and to use the updated source definition to automatically update all instances of the source definition, wherein automatically updating the source definition includes automatically promulgating back the change made to the instance of the source definition to the source definition, and wherein automatically updating all instances of the source definition includes automatically cascading the updated source definition to update all instances of the source definition.

7. A non-transitory computer readable medium storing instructions that, when executed by at least a processor of a computer, cause the processor to perform a method of definition control in a data repository application, the method comprising:
defining structures for the data repository application;
storing each structure and a source definition corresponding to the structure in a definitions library;
creating an object that points to the source definition as the source definition for each structure stored in the definitions library is used as a source definition instance;
interconnecting each structure for which the object is created;
building the data repository application for a specific use that includes each of the interconnected structures;
automatically tracking source definition instances;
testing the source definition instance and causing the source definition instance to be changed based at least in part on the testing; and
in response to a change made to the source definition instance, automatically updating the source definition with the same change made to the source definition instance and using the updated source definition to automatically update all corresponding source definition instances, wherein automatically updating the source definition includes automatically promulgating back the change made to the source definition instance to the source definition, and wherein automatically updating all corresponding source definition instances includes automatically cascading the updated source definition to update all corresponding source definition instances.

* * * * *

UNITED STATES PATENT AND TRADEMARK OFFICE
CERTIFICATE OF CORRECTION

| | | |
|---|---|---|
| PATENT NO. | : 8,205,189 B2 | Page 1 of 1 |
| APPLICATION NO. | : 11/777568 | |
| DATED | : June 19, 2012 | |
| INVENTOR(S) | : Grossman et al. | |

It is certified that error appears in the above-identified patent and that said Letters Patent is hereby corrected as shown below:

On sheet 2 of 9, in figure 1B, Reference Numeral 110, line 2, delete "Implimentation" and insert -- Implementation --, therefor.

On sheet 8 of 9, in figure 6B, Reference Numeral 606A, line 1, delete "Defintions" and insert -- Definitions --, therefor.

In column 13, line 34, delete "and or" and insert -- and/or --, therefor.

In column 14, line 54, delete "Worktlow," and insert -- Workflow, --, therefor.

Signed and Sealed this
Fourth Day of September, 2012

David J. Kappos
*Director of the United States Patent and Trademark Office*